Nov. 11, 1941.        I. G. GLAZ        2,262,605
FOOD GRINDER COVER
Filed Oct. 9, 1940
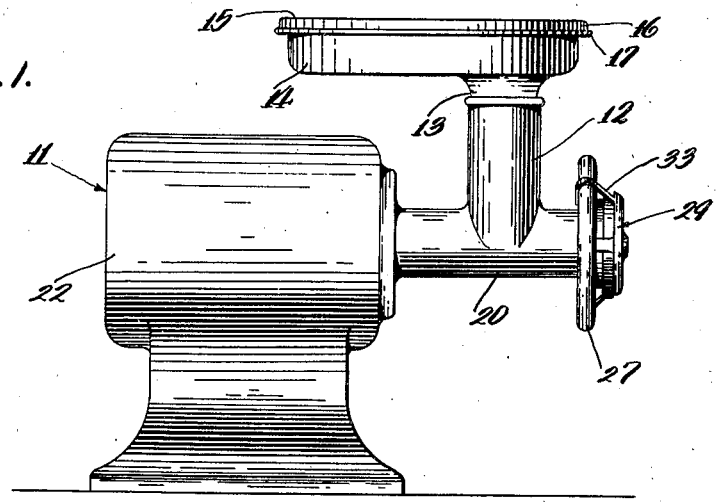
Fig. 1.
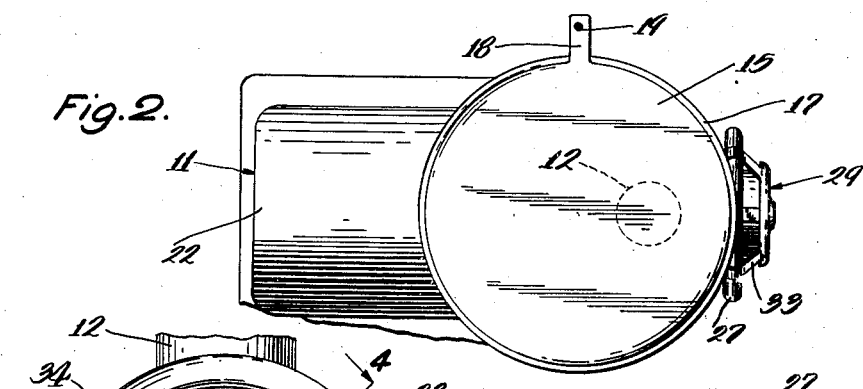
Fig. 2.
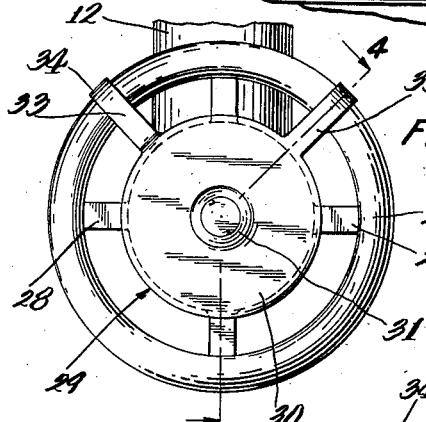
Fig. 3.
Fig. 4.
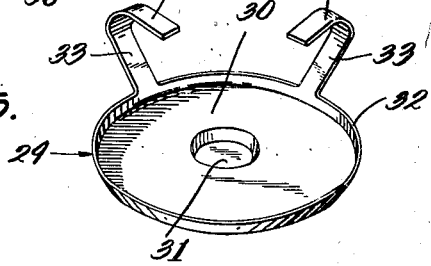
Fig. 5.
ISRAEL G. GLAZ
INVENTOR
BY Walter C. Kelsey
ATTORNEY Patented Nov. 11, 1941

2,262,605

UNITED STATES PATENT OFFICE 2,262,605

FOOD GRINDER COVER

Israel G. Glaz, Cleveland, Ohio

Application October 9, 1940, Serial No. 360,351

3 Claims. (Cl. 146—182)

This invention relates to covers or closures, and more particularly to readily attachable and detachable closures, for covering food grinder hoppers, extrusion outlets, and the like.

Food grinders whether used in meat shops, restaurants, homes, or other places, if left exposed after being used, attract flies, insects, dust, and dirt, thereby creating an unsanitary condition, likely to contaminate the food left on the grinder. This is particularly true of meat grinders, which ordinarily are not provided with closures to protect the exposed inlet and outlet orifices thereof. Recourse is sometimes had to improvised closures of various kinds, such as cloth, paper, wood blocks, or the like, but such closures obviously are not adapted to satisfactorily cover and protect the grinder orifices, as they are not properly fitted to such orifices and thereby allow flies, insects, and dirt to accumulate there.

Therefore an object of my invention is to provide quickly and easily attachable and detachable closures, for the intake and outlet orifices of food grinders and the like.

Other objects are to provide a closure, of the type described, which can be produced at a relatively low cost and may be used on grinder orifices of varying sizes, said closures being easily manipulated and adapted to be easily placed and positively retained in closure position over a grinder orifice, for preventing the accumulation of flies, insects, and dirt at such places.

Other and further objects of the invention will appear in the course of the following specification.

In the drawing accompanying this specification and forming a part of this application:

Figure 1 is a side elevational view of a meat grinder,

Figure 2 is a top plan view,

Figure 3 is an enlarged elevational view of the outlet side of the grinder,

Figure 4 is a sectional view taken on the line 4—4 of Figure 3, while

Figure 5 is a perspective view of the outlet closure member.

In the drawing, the numeral 11 refers generally to a grinder, of a well known type and construction, adapted to grind meat and the like, having an upwardly extending hopper 12, receiving a cooperating spout 13, extending downwardly from a circular tray 14, serving as a receptacle for the meat which is fed into the hopper 12, as will be readily understood. A circular cover 15 having a downwardly extending peripheral flange 16 terminating in a marginal bead 17 is adapted to be placed over the tray 14 and is retained there by the flange 16, in an obvious manner. Preferably a flat hanger 18, formed integrally with the cover 15 and projecting radially from the side thereof, is provided with an aperture 19, permitting the cover 15 to be hung on a nail or peg when not in use, and serves as a convenient handle therefor.

The hopper 12 is mounted on, and is in communication with, a horizontally extending extrusion casing 20, housing an extruding worm 21, driven at its inner end by a motor 22 and adapted to grind and carry outwardly along in the casing 20 meat fed from the tray 14 into the hopper 12, and force it outwardly through a sieve 23, positioned at the outlet orifice of the casing 20, in accordance with recognized practice. A retaining rim 24, having an internally threaded portion 25 engaging the front outer end of the casing 20, is provided with a vertically disposed portion 26 serving to releasably retain the sieve 23 and the worm 21 in position, as shown in Figure 4.

An annular manipulating handle 27, spaced from and surrounding the casing 20 near the outer end thereof, and connected to the retaining rim 24 by means of connecting members 28, provides means for readily manipulating the rim 24 in screw-threadedly attaching it to and detaching it from the front end of the casing 20, and this permits the parts to be cleaned or adjusted whenever such operations are required, as frequently is the case with food grinder parts.

A cover 29 for the extrusion end of the casing 20, as illustrated in Figure 5, comprises a generally flat annular portion 30 having an outwardly projecting central portion 31, and a rearwardly extending peripheral flange 32. A pair of spaced hangers 33, extending angularly from the flange 32 of the cover 29, are provided at their outer ends with curved portions 34 adapted to be looped around the manipulating handle 27, as shown in Figures 1, 2, and 4, for releasably retaining the cover 29 over the extrusion end of the casing 20. The cover 29 may be made of aluminum or other light material, and if desired, the hangers 33 may be formed integrally with the cover 29 by a stamping operation. The cover hangers 33 may be made of pliable material such as aluminum, tin, steel, or the like, in order that they may be bent by the user to engage the manipulating handle, or other cover supporting member of the particular grinder used. Thus the cover 29 may be used on various types of grinders and the like as the hangers 33 may be readily adjusted for use on grinders and the like having various types and forms of supporting members.

The hopper cover 15 is placed on the top of the tray 14 with the flanges 16 engaging the top outer portion of the tray 14, and may be removed by merely lifting it therefrom in an obvious manner. The extrusion end cover 29 is placed in a covering position, by merely hanging the curved portions 34 of the cover hangers 33 around the manipulating handle 27, the angular relation of the hangers 33 serving to securely hold the cover 29 against the extrusion end of the casing 20, as shown in Figures 1, 2, and 4. Attention is drawn to the fact that the position and arrangement of the hangers 33 is such that careful or accurate placing of the cover 29 over the extrusion end is not required, as the hangers 33 serve to draw and center the cover 29 tightly against the outer end of the casing 20. The hangers 33 may be readily bent to fit various supporting means and thus the cover 29 has a wide range of adaptability on various types of devices.

It is not intended to limit the use of my cover to meat grinding machines as it may be successfully used on many other machines and devices, where an accurately seating and readily detachable cover is required. It therefore will be apparent to those skilled in the art, that the invention herein disclosed may be variously changed, used, or modified, without departing from the spirit of the invention, or sacrificing the advantages thereof, and that the embodiment of the invention herein disclosed is illustrative only, and that my invention is not limited thereto.

I claim:

1. A detachable cover for a food grinder and the like having a generally horizontally extending casing provided with a food dispensing orifice in a substantially vertical plane at its outer end, a member extending at least partially around the top of said casing inwardly from the outer end thereof, a cover adapted to close said orifice, and a plurality of spaced hangers extending angularly from the plane of said cover toward said member, said hangers having hooks at the outer ends thereof and being positioned and arranged in such manner that the hooked ends of said hangers are adapted to be looped over said casing member, whereby said cover is suspended by said hangers and drawn against said orifice by its own weight.

2. A detachable cover for a food grinder and the like having a generally horizontally extending casing provided with a food dispensing orifice in a substantially vertical plane at its outer end, a circular member extending at least partially around the top of said casing inwardly from the outer end thereof, a substantially circular cover adapted to close said orifice, and a plurality of spaced hangers extending angularly from the plane of said cover toward said member in a manner radial with respect to the axis of said cover, said hangers having hooks at the outer ends thereof and being positioned and arranged in such manner that the hooked ends of said hangers are adapted to be looped over said casing member, whereby said cover is suspended by said hangers and drawn against said orifice by its own weight and the radial relation of said hangers retains said cover on said orifice in axial alignment with the casing axis.

3. A detachable cover for a food grinder and the like having a generally horizontally extending casing provided with a food dispensing orifice in a substantially vertical plane at its outer end, a member extending at least partially around the top of said casing inwardly from the outer end thereof, a substantially flat cover adapted to close said orifice, and a plurality of spaced hangers formed integrally with said cover and extending angularly from the plane of said cover toward said member, said hangers having hooks at the outer ends thereof and being positioned and arranged in such manner that the hooked ends of said hangers are adapted to be looped over said casing member, whereby said cover is suspended by said hangers and drawn against said orifice by its own weight.

ISRAEL G. GLAZ.